United States Patent
He et al.

(10) Patent No.: US 11,105,949 B2
(45) Date of Patent: Aug. 31, 2021

(54) ELECTROMAGNETIC PREDICTION METHOD FOR CONCEALED MINES

(71) Applicant: Institute of Geology and Geophysics, Chinese Academy of Sciences, Beijing (CN)

(72) Inventors: Lanfang He, Beijing (CN); Zhanxiang He, Beijing (CN); Hongchun Yao, Beijing (CN); Rujun Chen, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 16/997,817

(22) Filed: Aug. 19, 2020

(65) Prior Publication Data

US 2021/0181368 A1    Jun. 17, 2021

(30) Foreign Application Priority Data

Jun. 26, 2019 (CN) .......................... 201910560517.9

(51) Int. Cl.
*G01V 3/38* (2006.01)
*G01V 3/20* (2006.01)
(Continued)

(52) U.S. Cl.
CPC ............... *G01V 3/38* (2013.01); *G01V 3/20* (2013.01); *G01V 3/081* (2013.01); *G01V 3/12* (2013.01);
(Continued)

(58) Field of Classification Search
CPC ... G01V 3/38; G01V 3/20; G01V 3/08; G01V 3/081; G01V 3/18; G01V 3/30; G01V 3/34; G01V 3/12
See application file for complete search history.

(56) References Cited

U.S. PATENT DOCUMENTS 2,201,256 A * 5/1940 Barret ...................... G01V 3/12
324/329
3,108,220 A * 10/1963 Ruddock ................ G01V 3/165
324/330
(Continued)

FOREIGN PATENT DOCUMENTS

AU    2006246446 A1 *  6/2007
CN      101017205 A     8/2007
(Continued)

OTHER PUBLICATIONS

Hong Liu et al.; Application of Continuous Electromagnetic Profiling in Exploration in Foothill Belt; Geophysical Prospecting for Petroleum; Exploration & Production Research Institute; Sep. 2004; pp. 492-496; vol. 43, No. 5 Urumqi, China.
(Continued)

*Primary Examiner* — Daniel R Miller
*Assistant Examiner* — Christian T Bryant
(74) *Attorney, Agent, or Firm* — Andrew D. Fortney; Central California IP Group, P.C.

(57) ABSTRACT

Disclosed is an electromagnetic prediction method for concealed orebodies. A factor associated with an observation direction and a factor associated with a frequency are retrieved from tensor impedance data after static shift recognition and correction. An electromagnetic recognition factor including anisotropic characteristics is constructed. A probability of a developed orebody in a particular underground depth range of a target area is then inferred by using the electromagnetic recognition factor alone or as a component of comprehensive prediction information. Due to the full use of a potential correlation between anisotropic characteristics of frequency domain electromagnetic fields and an apparent metal factor and two-dimensional (or three-dimensional) extended concealed orebodies, the success rate
(Continued)

of predicting spatial locations and attributes of the concealed orebodies is improved.

6 Claims, 3 Drawing Sheets

(51) Int. Cl.
  *G01V 3/30* (2006.01)
  *G01V 3/18* (2006.01)
  *G01V 3/12* (2006.01)
  *G01V 3/34* (2006.01)
  *G01V 3/08* (2006.01)

(52) U.S. Cl.
  CPC ............... *G01V 3/18* (2013.01); *G01V 3/30* (2013.01); *G01V 3/34* (2013.01)

(56) References Cited

U.S. PATENT DOCUMENTS

| | | | |
|---|---|---|---|
| 7,852,088 B2 | 12/2010 | Liu | |
| 8,112,227 B2 | 2/2012 | Rabinovich et al. | |
| 8,797,828 B1 * | 8/2014 | Lev | G01V 11/00 367/64 |
| 2009/0315539 A1 * | 12/2009 | Helwig | G01V 3/083 324/149 |

FOREIGN PATENT DOCUMENTS

| | | | |
|---|---|---|---|
| CN | 101071179 A | | 11/2007 |
| CN | 104267443 A | * | 1/2015 |
| CN | 105204078 A | * | 12/2015 |
| CN | 108459358 A | | 8/2018 |

OTHER PUBLICATIONS

Lanfang He et al.; "Application of EM Methods for the Investigation of Qiyueshan Tunnel, China"; JEEG; Jun. 2006; pp. 151-156; vol. 11, Issue 2.

U. Autio et al.; "Combining Electromagnetic Measurements in the Mygdonian Sedimentary Basin, Greece"; Journal of Applied Geophysics; on or around Oct. 17, 2016; 29 pgs.; Preprint manuscript submitted to Elsevier.

Tom Bresnahan et al.; "Surfer 8 Self-Paced Training Guide"; Golden Software, Inc.; 21 pgs.; http://www.goldensoftware.com.

Qingyun Di et al.; "Development of the Emerging Electromagnetic Methods for Deep Earth Exploration"; International Symposium on Deep Earth Exploration and Practices; Oct. 24-26, 2018; 5 pgs.; Beijing, China.

Fatima El Hmidi et al.; "Electromagnetic Survey to Constraints Ore Mining Exploration in the Eastern Anti-Atlas Belt (case of Imiter Inlier, Morocco): Application of Frequency Electromagnetic Helicopter-Borbe Method"; Journal of African Earth Sciences; 2019; 12 pgs.; Elsevier.

M. Bustillo Revuelta; "Mineral Resource Exploration"; Mineral Resources; Springer Textbooks in Earth Sciences, Geography and Environment; 2018; 102 pgs.; Springer International Publishing AG.

K. Vozoff; "The Magnetotelluric Method"; Chapter 8; downloaded from http://library.seg.org/.

* cited by examiner

ELECTROMAGNETIC PREDICTION METHOD FOR CONCEALED MINES

BACKGROUND

Technical Field

The invention belongs to the technical field of mineral geophysical exploration, relates to geo-electromagnetic prediction of concealed orebodies, and more particularly, to geo-electromagnetic exploration of a concealed orebody with the extension along the strike being far beyond the orebody.

Related Art

An electromagnetic exploration method is an important technology for the exploration of mineral resources (especially metal mines and groundwater). However, the exploration of concealed orebodies, especially the exploration of thin-layer concealed orebodies, still proves difficulty in geophysical and geological exploration.

In mineral resource exploration by using surface, aerial or borehole frequency-based electromagnetic method, misoperation, rough terrain, and steep geostructures may lead the "static shift", which appears as the shift of an apparent resistivity curve in double logarithmic coordinates. As a result, it is necessary to perform static shift correction by using the acquired resistivity information before selecting an upper curve (TE or TM, TM in most cases) or a geometric average for inversion. The favorable areas are then delineated based on the low-resistivity anomalies and the known geological information (El Hmidi, F., Chakiri, S., Hafid, M., Manar, A., & Bejjaji, Z. (2019). Electromagnetic survey to constraints ore mining exploration in the eastern Anti-Atlas belt (case of Imiter inlier, Morocco): Application of frequency electromagnetic helicopter-borne method. *Journal of African Earth Sciences*, 150, 595-606.; Di, Q., Xue, G., Wang, Z., An, Z., Fu, C., Wang, R., . . . & Olalekan, F. (2019). Development of the emerging electromagnetic methods for deep earth exploration. *Acta Geologica Sinica-English Edition*, 93, 313-317. Revuelta, M. B. (2018). Mineral Resource Exploration. In *Mineral Resources* (pp. 121-222). Springer, Cham.). Conventional prediction methods for concealed orebodies have the following shortages: (1) The conventional static shift correction methods, such as the invariant response parameter method, the curve shift method, the statistical average method, the spatial filtering method, the distortion tensor method, and the numerical simulation method, will weaken or filter out the anomalies origin from the distribution of the shallow surface. As a result, some local ore-bearing clues are filtered out during the correction. (2) Optimal curves are selected from E polarization (TE), H polarization (TM) or the geometric average of the two by using tensor frequency domain electromagnetic data to form a profile for inversion or conversion. A potential correlation between electromagnetic anisotropic characteristics of frequency domain and two-dimensional (or three-dimensional) extended concealed orebodies is not fully used. As a result, the success rate of predicting spatial locations and attributes of the concealed orebodies is low.

SUMMARY

In view of deficiencies in the prior art, the invention is to provide an electromagnetic prediction method for concealed orebodies, to fully explores a potential relationship between electromagnetic data and spatial distribution patterns and metallogenetic attributes of concealed mineral resources (or ore-bearing structures thereof), thereby improving the success rate of recognizing a concealed orebody by using an electromagnetic method.

To achieve the above objective, the invention is implemented by the following technical solutions.

1. An electromagnetic prediction method for concealed orebodies, comprising the following steps:

(1) data acquisition: deploying a two-dimensional survey line or swath in a direction in which the surface of a target area intersects the strike of a prediction target, and observing electromagnetic fields in a survey line direction and a direction perpendicular to the survey line direction at a same survey point;

(2) tensor impedance data acquisition: processing acquired electromagnetic field data into tensor impedance data;

(3) static shift recognition and correction: performing a static shift analysis of the obtained tensor impedance data, recognizing the presence of a static shift, and performing static shift correction on tensor impedance data with the static shift;

(4) electromagnetic recognition factor acquisition: respectively retrieving a correlation factor $\alpha_1$ associated with an observation direction and an apparent metal factor $\alpha_2$ associated with a frequency according to the tensor impedance data with the corrected static shift obtained in Step (3), and then calculating an electromagnetic recognition factor α by using the following formula:

$$\alpha = \lambda_1 \alpha_1 + \lambda_2 \alpha_2$$

wherein $\lambda_1$ and $\lambda_2$ are respectively weighting coefficients of the correlation factor $\alpha_1$ and the apparent metal factor $\alpha_2$ and are set according to geological-geophysical information of the target area;

the correlation factor $\alpha_1$ associated with the observation direction is an impedance ratio $F_{EM}$ or a phase difference $P_{EM}$:

$$F_{EM} = 2\sqrt{(Z_{xy} - Z_{yx})^2 / (Z_{xy} + Z_{yx})^2}$$

wherein $Z_{xy}$ and $Z_{yx}$ respectively represent a modulus of an impedance component or an apparent resistivity in the survey line direction and the direction perpendicular to the survey line direction, or respectively represent an impedance component or an apparent resistivity of tensor impedance in a principal axis direction and a direction perpendicular to the principal axis direction after rotation to an impedance principal axis, $$P_{EM} = \sqrt{(P_{xy} - P_{yx})^2}$$

wherein $P_{xy}$ and $P_{yx}$ respectively represent a phase of an impedance component in the survey line direction and the direction perpendicular to the survey line direction, or respectively represent a phase of an impedance component of tensor impedance in the principal axis direction and the direction perpendicular to the principal axis direction after rotation to the impedance principal axis; and the apparent metal factor $\alpha_2$ associated with the frequency is determined by a ratio of a square of an impedance modulus difference at different frequencies to a square of a product of impedance modulus values of high and low frequencies:

$$\alpha_2 = \sqrt{(Z_{lf} - Z_{hf})^2 / (Z_{lf} \times Z_{hf})^2}$$

wherein $Z_{lf}$ and $Z_{hf}$ are impedance moduli or apparent resistivities of a low frequency and a high frequency respectively;

(5) frequency to depth domain conversion: converting the tensor impedance data with the corrected static shift into a profile comprising depth-resistivity information, and performing depth restoration with the electromagnetic recognition factor; and (6) concealed orebody prediction:

predicting a developed orebody in a set depth range of the target area according to the electromagnetic recognition factor; or constructing a concealed orebody recognition model according to the electromagnetic recognition factor and the geological-geophysical information of the target area, and predicting a developed orebody in a set depth range of the target area according to the constructed concealed orebody recognition model.

According to the electromagnetic prediction method for concealed orebodies above, Step (1) is to acquire the resistivity distribution of the target area. Therefore, a two-dimensional survey line or swath (a combination of a plurality of close parallel or approximately parallel survey lines) is deployed in a direction in which the surface of a target area is perpendicular to or intersects the strike of a prediction target (provided by prior geological data or obtained through analysis based on topographic data) at a large angle (for example, greater than 60°). Electromagnetic fields changing with time in a survey line direction and a direction perpendicular to the survey line direction are then simultaneously observed at a same survey point. The electromagnetic fields may be from natural sources (passive sources, where magnetotelluric fields are measured) or artificial sources (active sources, where artificially emitted electromagnetic fields are measured). Generally, each survey line includes five or more survey points, and each survey point includes frequency domain electromagnetic field exploration data at 10 or more frequencies.

According to the electromagnetic prediction method for concealed orebodies, Step (2) is to process acquired electromagnetic field data into tensor impedance data at different frequencies without being affected by an acquisition device. Electrical characteristic parameters such as resistivity and phase may be shown from the tensor impedance data.

According to the electromagnetic prediction method for concealed orebodies, in Step (3), due to terrain and non-geological reasons, parallel (or approximately parallel) separation of resistivity curves in two observation directions in a double logarithmic coordinate system is caused. To reduce the separation, in the invention, it is first evaluated and recognized whether there is a static shift in observation data by using a specific algorithm, the present static shift is corrected, and a location determined by the algorithm is restored from a curve affected by the static shift.

Different implementations may be used for recognizing and correcting a static shift in the obtained tensor impedance data:

(a) A threshold range of static shift determination is set by using an average tensor impedance value of a plurality of adjacent survey points of a same frequency band. When the tensor impedance data obtained in Step (2) has tensor impedance exceeding the threshold range, it indicates that a static shift is present, or otherwise, it indicates that a static shift is not present.

Next, an apparent resistivity profile and a phase profile of the tensor impedance data are windowed by using the following steps respectively to filter out or weaken the static shift:

(A1) A two-dimensional (spatial location-frequency) filter coefficient matrix is constructed, and the matrix is used as a processing window.

(A2) Two-dimensional spatial filtering is performed, by using the two-dimensional (spatial location-frequency) filter coefficient matrix, on frequency-apparent resistivity profile data after a profile is formed according to survey point locations, to complete static shift correction of the apparent resistivity profile. The process of processing the phase profile is the same.

(b) A wavelet analysis is performed on the tensor impedance data obtained in Step (2) to determine whether there is a static shift in the tensor impedance data and correct the static shift. In a specific implementation, average impedance modulus values of a plurality of frequencies of a middle frequency band in the survey line direction represent corresponding survey points, the average impedance modulus values representing the corresponding survey points are connected in the survey line direction to form a profile curve, a wavelet analysis is performed on the profile curve to obtain a time-frequency spectrum of the entire survey line, and obtained filter coefficients are used to determine whether there is a static shift in the tensor impedance data and correct the static shift.

The above two implementations of recognizing and correcting a static shift in tensor impedance data are only used for facilitating the understanding of the technical solution of the invention, but do not constitute a limitation to the technical solution of the invention.

According to the electromagnetic prediction method for concealed orebodies, in Step (4), data (for example, data respectively representing an impedance modulus of an impedance component, an apparent resistivity, a phase of an impedance component or the like in the survey line direction and the direction perpendicular to the survey line direction) associated with an ore-bearing structure (for example, an observation direction) or graphs are retrieved from tensor impedance electromagnetic observation data obtained after static shift recognition and correction. An electromagnetic recognition factor is calculated according to the retrieved associated data. This is the core of the invention. The retrieval of the electromagnetic recognition factor includes, but is not limited to, the following methods: an impedance ratio method, a phase difference method, and the like. First, a correlation factor associated with an observation direction and an apparent metal factor (AMF) associated with a frequency are retrieved according to the methods. An electromagnetic recognition factor is then calculated by using the correlation factor and the apparent metal factor (AMF).

According to the electromagnetic prediction method for concealed orebodies, in Step (5), the tensor impedance data with the corrected static shift and the electromagnetic recognition factor are converted into a profile including depth-resistivity and depth-electromagnetic recognition factor information by using a single-point frequency to depth domain conversion algorithm, a conversion algorithm with two-dimensional profile filtering or a two-dimensional inversion method, so as to obtain a depth range corresponding to frequencies on the survey line.

According to the electromagnetic prediction method for concealed orebodies, in Step (6), a developed orebody may be predicted by using the electromagnetic recognition factor in two manners: (1) predicting a developed orebody in a particular underground depth range of a target area (or a research area) by using the electromagnetic recognition factor alone provided in the invention; and (2) constructing a concealed orebody recognition model with geological-geophysical information of a target area (or research area) by using the electromagnetic recognition factor as a component of comprehensive prediction information, and predicting a developed orebody in a particular underground depth range of the target area (or research area) according to the constructed concealed orebody recognition model.

A person skilled in the art may adjust model parameters and various parameter weights according to different metallogenetic backgrounds, metallogenetic types (such as a magma type, a hydrothermal type or a sedimentary transformation type) and ore-controlling factors (such as structural ore control and stratum ore control) in a target area to obtain a concealed orebody recognition model suitable for the target area.

Compared with the prior art, the electromagnetic prediction method for concealed orebodies provided in the invention has the following beneficial effects.

1. In the invention, a factor associated with an observation direction and a factor associated with a frequency are retrieved from tensor impedance data after static shift recognition and correction. An electromagnetic recognition factor is constructed. A probability of a developed orebody in a particular underground depth range of a target area is then inferred by using the electromagnetic recognition factor alone or as a component of comprehensive prediction information. Due to the full use of a potential correlation between impedance component anisotropic characteristics of frequency domain and two-dimensional (the extension of the orebody along the strike is much larger than the extension along the trend) or three-dimensional (the extension of the orebody along the strike is equivalent to the extension along the trend) extended concealed orebodies, the success rate of predicting spatial locations and attributes of the concealed orebodies is improved.

2. In the invention, tensor impedance is statically recognized and corrected. In this way, it can be ensured that recognition information retrieved from impedance information does not include (or includes to a small extent) the influence of a static shift.

DETAILED DESCRIPTION

The invention is described below in detail with reference to an embodiment. It is necessary to point out that this embodiment is only used to further describe the invention, but it cannot be understood as a limitation to the protection scope of the invention. A person skilled in the art can make some non-essential improvements and adjustments to the invention according to the above content of the invention.

Figure 1:
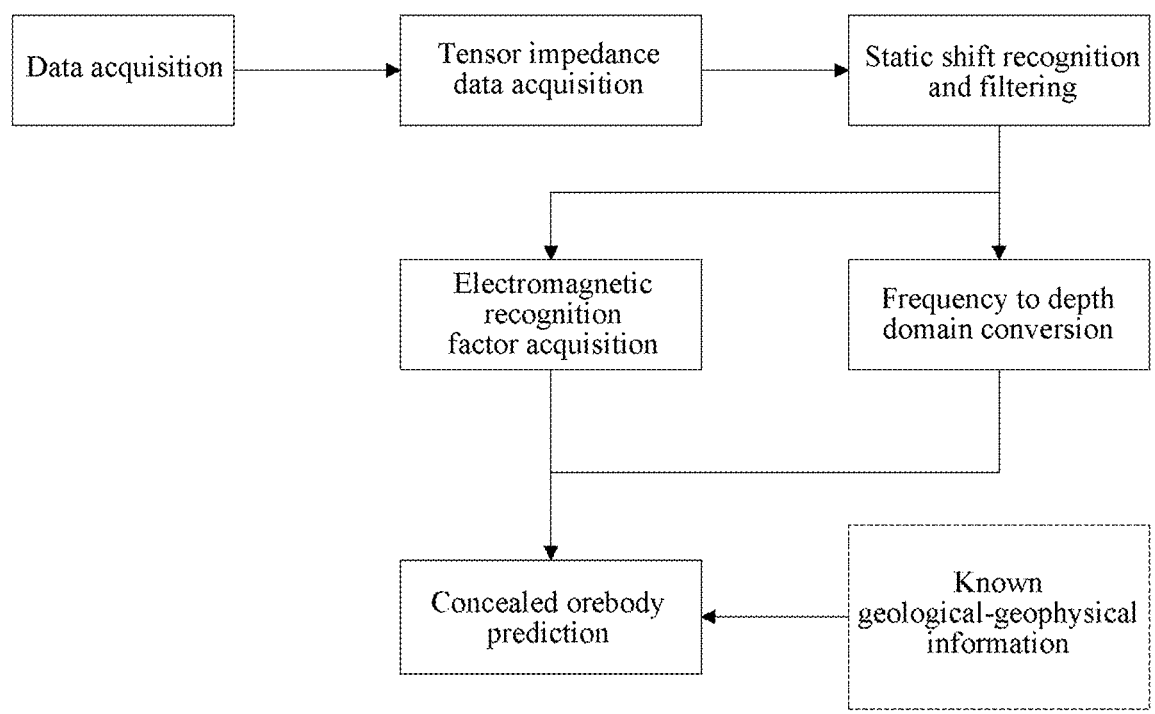
FIG. 1 is a schematic diagram of a technical route of an electromagnetic prediction method for concealed orebodies according to the invention.

An electromagnetic prediction method for concealed orebodies provided in this embodiment, as shown in FIG. 1, includes Steps (1) to (6).

(1) data acquisition: deploying a two-dimensional survey line or swath in a direction in which the surface of a target area intersects the strike of a prediction target, and observing electromagnetic fields in a survey line direction and a direction perpendicular to the survey line direction at a same survey point;

For example: a two-dimensional survey line or swath (a combination of a plurality of close parallel or approximately parallel survey lines) is deployed in a direction in which the surface of a target area is perpendicular to or intersects the strike of a prediction target (provided by prior geological data or obtained through analysis based on topographic data) at a large angle (for example, greater than 60°). Electromagnetic fields changing with time in a survey line direction and a direction perpendicular to the survey line direction are then simultaneously observed at a same survey point. The electromagnetic fields may be from natural sources (passive sources, where magnetotelluric fields are measured) or artificial sources (active sources, where artificially emitted electromagnetic fields are measured). Generally, each survey line includes five or more survey points, and each survey point includes frequency domain electromagnetic field exploration data at 10 or more frequencies.

(2) tensor impedance data acquisition: processing acquired electromagnetic field data into tensor impedance data;

In Steps (1) and (2) of this embodiment, conventional data processing methods that have been disclosed in the art are used for acquisition. Reference may be made to Vozoff, K. (1991). The magnetotelluric method. In Electromagnetic Methods in Applied Geophysics: Volume 2, Application, Parts A and B (pp. 641-712). Society of Exploration Geophysicists.

(3) static shift recognition and correction: performing a static shift analysis of the obtained tensor impedance data, recognizing the presence of a static shift, and performing static shift correction on tensor impedance data with the static shift;

Due to terrain and non-geological reasons, parallel (or approximately parallel) separation of resistivity curves in two observation directions in a double logarithmic coordinate system is caused. To reduce the separation, in the invention, it is first evaluated and recognized whether there is a static shift in observation data by using a specific algorithm, the present static shift is corrected, and a location determined by the algorithm is restored from a curve affected by the static shift.

Different implementations may be used for recognizing and correcting a static shift in the obtained tensor impedance data:

(a) A threshold range of static shift determination is set by using an average tensor impedance value of a plurality of adjacent survey points of a same frequency band. When the tensor impedance data obtained in Step (2) has tensor impedance exceeding the threshold range, it indicates that a static shift is present, or otherwise, it indicates that a static shift is not present.

For example, for five (or more than five) consecutive survey points, average impedance modulus values of five (or more than five) frequencies of a middle frequency band of each survey point in a survey line direction and a direction perpendicular to the survey line direction are calculated respectively, and represent the impedance modulus value of the survey point in the survey line direction and the direction perpendicular to the survey line direction. Average impedance modulus values of five (or more than five) consecutive survey points in the survey line direction and the direction perpendicular to the survey line direction are calculated respectively. Threshold ranges in the survey line direction and the direction perpendicular to the survey line direction are respectively set according to different research areas and geophysical conditions (for example, upper and lower threshold limits are respectively set to be five times the average value and 0.2 times the average value). If the impedance modulus value of a survey point in the survey line direction or the direction perpendicular to the survey line direction is higher than (or lower than) a set upper threshold limit (or lower limit), it is considered that the survey point has a static shift. To improve the recognition rate, processing and confirmation may further be performed through human-computer interaction.

If the tensor impedance data has a static shift, an apparent resistivity profile and a phase profile of the obtained tensor impedance data are windowed by using the following steps respectively to filter out or weaken the static shift. The implementation includes the following sub-steps:

(A1) A filter coefficient matrix (for example, a Gaussian filter matrix) is constructed, and the matrix is used as a processing window.

As a processing window, the filter coefficient matrix may cover a plurality of survey points (horizontal space) and frequencies (vertical space), so the filter coefficient matrix may also be referred to as a spatial location-frequency filter coefficient matrix.

(A2) Two-dimensional spatial filtering is performed, by using the two-dimensional (spatial location-frequency) filter coefficient matrix, on frequency-apparent resistivity profile data after a profile is formed according to survey point locations, to complete static shift correction of the apparent resistivity profile. The process of processing the phase profile is the same.

For an implementation of the filter coefficient matrix, reference may be made to conventional methods that have been disclosed in the art, for example, Bresnahan, T., & Dickenson, K. (2002). Surfer 8 self-paced training guide. *Golden Software Inc.*

(b) A wavelet analysis is performed on the tensor impedance data obtained in Step (2) to determine whether there is a static shift in the tensor impedance data and correct the static shift. In a specific implementation, average impedance modulus values of a plurality of frequencies of a middle frequency band in the survey line direction represent corresponding survey points, the average impedance modulus values representing the corresponding survey points are connected in the survey line direction to form a profile curve, a wavelet analysis is performed on the profile curve to obtain a time-frequency spectrum of the entire survey line, and obtained filter coefficients are used to determine whether there is a static shift in the tensor impedance data and correct the static shift.

For example, similar to the previous static shift recognition method, average impedance modulus values of five (or more than five) frequencies of a middle frequency band of each survey point in the survey line direction and the direction perpendicular to the survey line direction are calculated respectively, and represent corresponding survey point data. The average impedance modulus values representing the corresponding survey points are connected in the survey line direction to form a profile curve. A wavelet analysis is performed on the profile curve to obtain a time-frequency spectrum (the horizontal axis is distance, and the vertical axis is wavelet scale representing different band-pass filter coefficients) of the entire survey line. Mutation points of wavelet details (high-pass filtering results) are then used to recognize the position of the static shift. Wavelet coefficients (middle frequency band-pass filtering results) in a middle frequency area or ratios of wavelet coefficients in a middle frequency area to wavelet coefficients in a low frequency area are retrieved to further determine whether there is a static shift in the tensor impedance. Finally, the wavelet coefficients (low-pass filtering results) in the low frequency area corresponding to each survey point are used as static shift correction coefficients of the survey point. The static shift correction coefficients are normalized (a static shift correction coefficient of a survey point that does not include a static shift or includes the weakest static shift is set to 1, ratios of the remaining survey points to the survey point are calculated, and a relative coefficient is calculated). Each frequency of each survey point is statically corrected by using normalization coefficients. Herein, a wavelet transform method is used to obtain the time-frequency spectrum of the entire survey line by using conventional methods that have been disclosed in the art. A person skilled in the art can implement the recognition of the static shift in the tensor impedance according to the above-mentioned inventive concept.

The above-mentioned implementation of further determining whether there is a static shift in tensor impedance by using the wavelet coefficients (middle frequency band-pass filtering results) in the middle frequency area is: setting a threshold range according to an average value of the wavelet coefficients in the middle frequency area of five consecutive survey points (for example, setting upper and lower threshold limits respectively to be five times the average value of wavelet coefficients and 0.2 times the average value of wavelet coefficients). If the wavelet coefficients in the middle frequency area of a survey point exceed the range, it is determined that the survey point has a static shift.

The above-mentioned implementation of further determining whether there is a static shift in tensor impedance by using the ratio of wavelet coefficients in a middle frequency area to wavelet coefficients in a low frequency area is: calculating a ratio of wavelet coefficients in a middle frequency area to wavelet coefficients in a low frequency area of each survey point, and then setting a threshold range according to an average ratio value of the entire survey line (for example, setting upper and lower threshold limits respectively to be higher than five times the average value or lower than 0.2 times the average value). If the ratio of wavelet coefficients in a middle frequency area to wavelet coefficients in a low frequency area of a survey point exceeds the range, it is determined that the survey point has a static shift.

(4) electromagnetic recognition factor acquisition.

data (for example, data respectively representing an impedance modulus of an impedance component, an apparent resistivity, a phase of an impedance component or the like in the survey line direction and the direction perpendicular to the survey line direction) associated with an ore-bearing structure (for example, an observation direction) or graphs are retrieved from tensor impedance electromagnetic observation data obtained after static shift recognition and correction. An electromagnetic recognition factor is calculated according to the retrieved associated data. This is the core of the invention. The retrieval of the electromagnetic recognition factor includes, but is not limited to, the following methods: an impedance ratio method, a phase difference method, and the like. First, a correlation factor associated with an observation direction and an apparent metal factor (AMF) associated with a frequency are retrieved according to the methods. An electromagnetic recognition factor is then calculated by using the correlation factor and the apparent metal factor (AMF).

respectively retrieving a correlation factor $\alpha_1$ associated with an observation direction and an apparent metal factor $\alpha_2$ associated with a frequency according to the tensor impedance data with the corrected static shift obtained in Step (3), and then calculating an electromagnetic recognition factor $\alpha$ by using the following formula:

$$\alpha = \lambda_1 \alpha_1 + \lambda_2 \alpha_2$$

wherein $\lambda_1$ and $\lambda_2$ are respectively weighting coefficients of the correlation factor $\alpha_1$ and the apparent metal factor $\alpha_2$ and are set according to geological-geophysical information of the target area;

the correlation factor $\alpha_1$ associated with the observation direction is an impedance ratio $F_{EM}$ or a phase difference $P_{EM}$:

$$F_{EM} = 2\sqrt{(Z_{xy} - Z_{yx})^2 / (Z_{xy} + Z_{yx})^2}$$

wherein $Z_{xy}$ and $Z_{yx}$ respectively represent a modulus of an impedance component or an apparent resistivity in the survey line direction and the direction perpendicular to the survey line direction, or respectively represent an impedance component or an apparent resistivity of tensor impedance in a principal axis direction and a direction perpendicular to the principal axis direction after rotation to an impedance principal axis, $$P_{EM} = \sqrt{(P_{xy} - P_{yx})^2}$$

wherein $P_{xy}$ and $P_{yx}$ respectively represent a phase of an impedance component in the survey line direction and the direction perpendicular to the survey line direction, or respectively represent a phase of an impedance component of tensor impedance in the principal axis direction and the direction perpendicular to the principal axis direction after rotation to the impedance principal axis; and the apparent metal factor $\alpha_2$ associated with the frequency is determined by a ratio of a square of an impedance modulus difference at different frequencies to a square of a product of impedance modulus values of high and low frequencies:

$$\alpha_2 = \sqrt{(Z_{lf} - Z_{hf})^2 / (Z_{lf} \times Z_{hf})^2}$$

where $Z_{lf}$ and $Z_{hf}$ are impedance moduli or apparent resistivities of a low frequency (less than 10 Hz) and a high frequency (greater than 100 Hz) respectively.

(5) frequency to depth domain conversion: converting the tensor impedance data with the corrected static shift into a profile comprising depth-resistivity information, and performing depth restoration with the electromagnetic recognition factor; and the tensor impedance data with the corrected static shift and the electromagnetic recognition factor are converted into a profile including depth-resistivity and depth-electromagnetic recognition factor information by using a single-point frequency to depth domain conversion algorithm, a conversion algorithm with two-dimensional profile filtering or a two-dimensional inversion method, so as to obtain a depth range corresponding to frequencies on the survey line.

The above-mentioned methods are conventional means that have been disclosed in the art. A person skilled in the art can implement the conversion of the tensor impedance from a frequency domain to a depth domain according to the above-mentioned inventive concept.

(6) concealed orebody prediction.

a developed orebody may be predicted by using the electromagnetic recognition factor in two manners: (1) predicting a developed orebody in a particular underground depth range of a target area (or a research area) by using the electromagnetic recognition factor alone provided in the invention; and (2) constructing a concealed orebody recognition model with geological-geophysical information of a target area (or research area) by using the electromagnetic recognition factor as a component of comprehensive prediction information, and predicting a developed orebody in a particular underground depth range of the target area (or research area) according to the constructed concealed orebody recognition model.

Weighted modeling is performed on electromagnetic recognition factors and other geological-geophysical information, parameters for constructing a concealed orebody recognition model and various parameter weights are determined by using different metallogenetic backgrounds, metallogenetic types (such as a magma type, a hydrothermal type or a sedimentary transformation type) and ore-controlling factors (such as structural ore control and stratum ore control) to construct a recognition model. Concealed orebodies are then predicted according to the concealed orebody recognition model. If there is no other geological-geophysical data in the research area, topographic factors participate in the weighting. However, the weight of the topographic factors does not exceed 30%. The recognition technology is relatively complex. However, compared with using electromagnetic recognition factors alone, the recognition risk of the recognition technology is lower.

Obviously, the above description provides only an embodiment of the invention. For a person skilled in the art, other similar methods may be obtained according to these descriptions without any creative effort.

Application Example

The research object of this application example is a concealed vein metal ore.

In this application example, the above-mentioned concealed orebodies of the target area are predicted by using the electromagnetic prediction method for concealed orebodies provided in Embodiment 1, which includes Steps (1) to (6).

(1) Data acquisition: A two-dimensional swath is deployed in a direction in which the surface of a target area is perpendicular to or intersects the strike of a prediction target at a large angle (greater than 60°), and electromagnetic fields in a survey line direction and a direction perpendicular to the survey line direction are observed at a same survey point.

Figure 3:
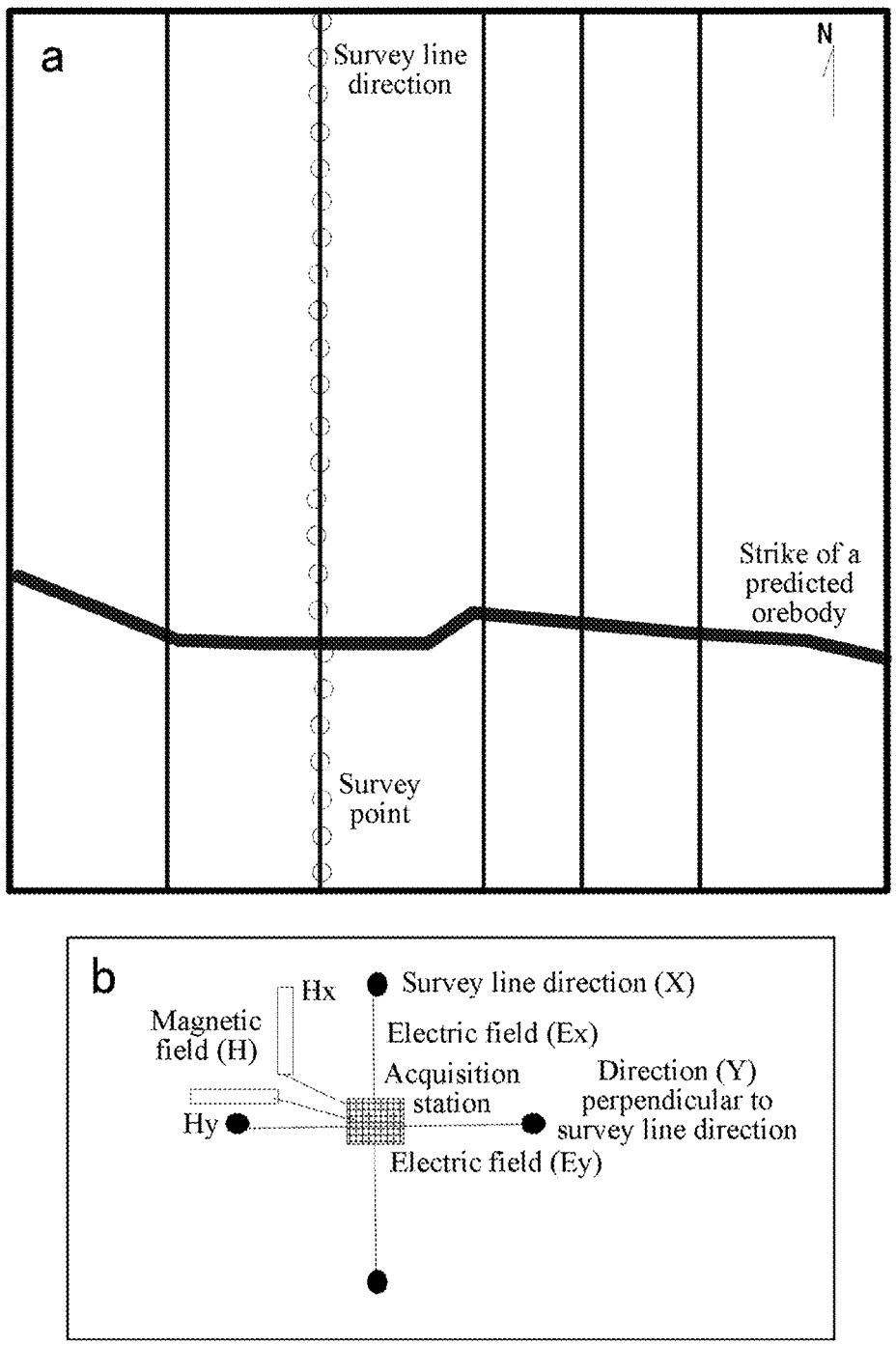
FIG. 3 is a schematic diagram of a field layout of the acquisition by using an electromagnetic method, where a is a schematic diagram of a survey line layout, and b is a schematic diagram of a survey point layout.

As shown in FIG. 3, in this application example, five survey lines are arranged in a direction perpendicular to the strike of a predicted orebody. Each survey line is provided with a plurality of survey points to collect orthogonal natural source audio magnetotelluric fields at different frequencies. The related methods have been documented in He, L., Feng, M., He, Z., & Wang, X. (2006). Application of EM methods for the investigation of Qiyueshan Tunnel, China. *Journal of Environmental & Engineering Geophysics*, 11(2), 151-156.

(2) Tensor impedance data acquisition: Acquired electromagnetic field data is processed into tensor impedance data.

The acquired electromagnetic field data is processed into tensor impedance data at different frequencies without being affected by an acquisition device. Resistivity and phase information in an observation frequency range of the survey point may be acquired from the tensor impedance data, or impedance information of different orientations may be acquired.

In this application example, conventional data processing methods that have been disclosed in the art are used for acquisition. Reference may be made to Vozoff, K. (1991). The magnetotelluric method. In *Electromagnetic Methods in Applied Geophysics: Volume 2, Application, Parts A and B* (pp. 641-712). Society of Exploration Geophysicists., He, L., Feng, M., He, Z., & Wang, X. (2006). Application of EM methods for the investigation of Qiyueshan Tunnel, China. *Journal of Environmental & Engineering Geophysics*, 11(2), 151-156., or the like.

Figure 2:
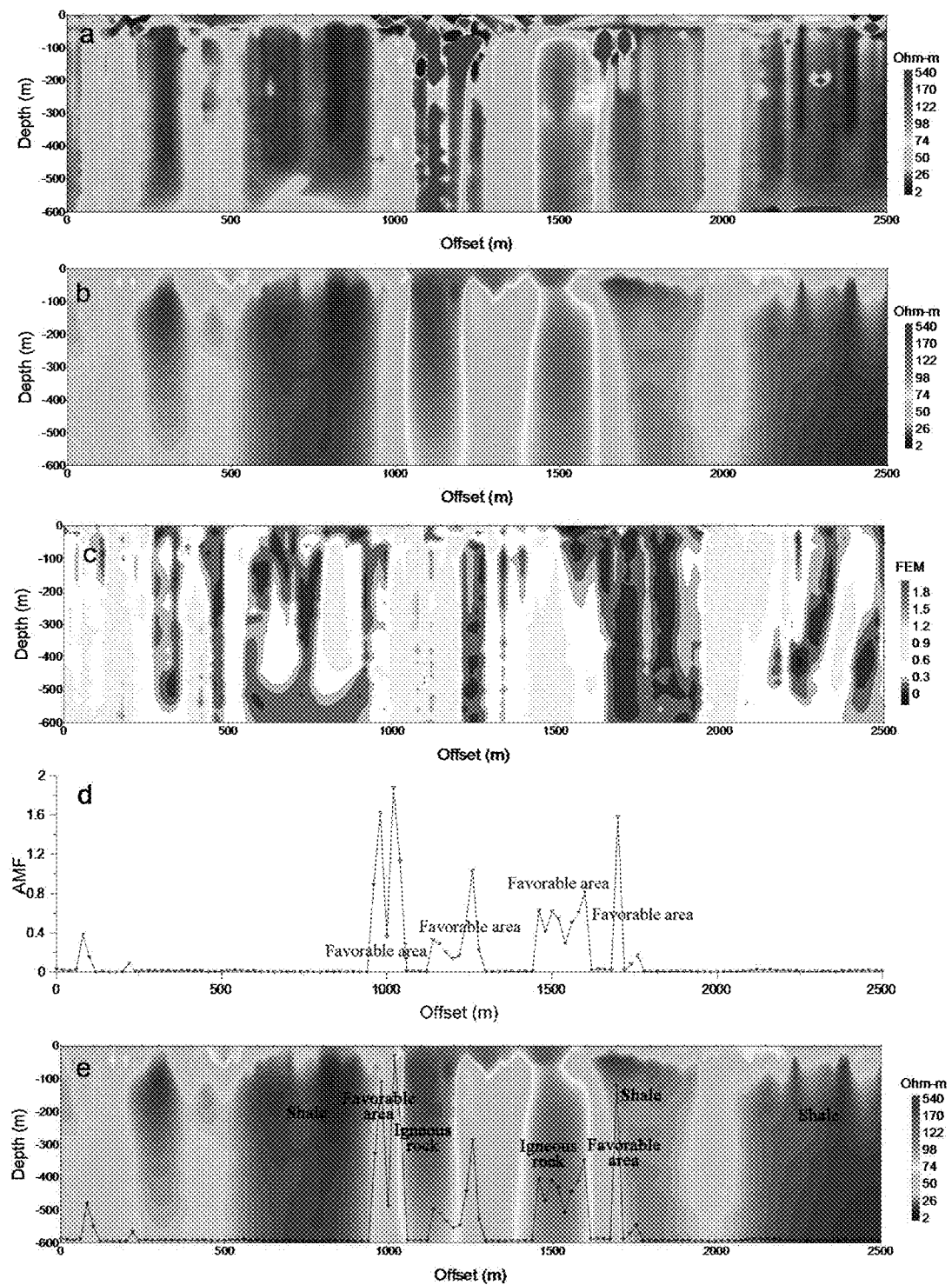
FIG. 2 is an effect diagram of a concealed orebody for a target area using an electromagnetic prediction method for concealed orebodies provided in the invention, where a is a depth-resistivity profile before static shift analysis, b is a depth-resistivity profile after static shift analysis, c is an impedance ratio profile after depth restoration, d is a schematic distribution diagram of an apparent metal factor in a survey point direction, and e is an effect diagram of the prediction of a concealed orebody recognition model.

In this application example, an obtained inversion resistivity profile without static shift recognition and correction is shown in FIG. 2a. It can be seen from the figure that a large number of local inhomogeneous electrical bodies are included in an inversion result diagram, and inversion results have very poor continuity in a lateral direction (in the survey line direction).

(3) static shift recognition and correction: performing a static shift analysis of the obtained tensor impedance data, recognizing the presence of a static shift, and performing static shift correction on tensor impedance data with the static shift;

In the present example, an implementation used for the recognition of a static shift in the obtained tensor impedance data is: setting a threshold range of static shift determination by using an average tensor impedance value of a plurality of adjacent survey points of a same frequency band. When the tensor impedance data obtained in Step (2) has tensor impedance exceeding the threshold range, it indicates that a static shift is present, or otherwise, it indicates that a static shift is not present.

Threshold range determination: Average impedance modulus values of five (or more than five) frequencies of a middle frequency band (in this application example, 40 frequencies are set: frequencies No. 15 to 20 are used as a middle frequency band, frequencies following the frequency No. 20 are used as a low frequency band, and frequencies preceding the frequency No. 15 are used as a high frequency band) of each of five consecutive survey points in the survey line direction and the direction perpendicular to the survey line direction are calculated respectively, and are used as the impedance modulus values of the survey point in the survey line direction and the direction perpendicular to the survey line direction. The average impedance modulus values of the five consecutive survey points in the survey line direction and the direction perpendicular to the survey line direction are calculated respectively. Threshold ranges in the survey line direction and the direction perpendicular to the survey line direction are respectively set according to different research areas and geophysical conditions (for example, upper and lower threshold limits are set to be five times the average value and 0.2 times the average value respectively). If the impedance modulus value of a survey point in the survey line direction or the direction perpendicular to the survey line direction is higher than (or lower than) a set upper threshold limit (or lower limit), it is considered that the survey point has a static shift. To improve the recognition rate, the processing and confirmation may further be implemented through human-computer interaction.

The tensor impedance data with the static shift is windowed by using the following steps to filter out or weaken the static shift:

(A1) A filter coefficient matrix (Gaussian filter matrix) is constructed, and the matrix is used as a processing window.

In this embodiment, the filter coefficient matrix is set as a 3×3 mean matrix $$\begin{vmatrix} 1 & 3 & 1 \\ 3 & 9 & 3 \\ 1 & 3 & 1 \end{vmatrix},$$

and as a processing window, the filter coefficient matrix may cover three survey points (horizontal space) and three frequencies (vertical space).

(A2) Two-dimensional spatial filtering is performed, by using the two-dimensional (spatial location-frequency) filter coefficient matrix, on frequency-apparent resistivity profile data after a profile is formed according to survey point locations, to complete static shift correction of the apparent resistivity profile. The process of processing the phase profile is the same.

In this application example, a conversion result obtained after spatial filtering in Step (2) in the above-mentioned manner is shown in FIG. 2b. It can be seen from the figure that local inhomogeneous electrical bodies are effectively filtered out, and inversion results have better continuity in a lateral direction (in the survey line direction).

(4) electromagnetic recognition factor acquisition: respectively retrieving a correlation factor $\alpha_1$ associated with an observation direction and an apparent metal factor $\alpha_2$ associated with a frequency according to the tensor impedance data with the corrected static shift obtained in Step (3), and then calculating an electromagnetic recognition factor $\alpha$ by using the following formula:

$$\alpha = \lambda_1 \alpha_1 + \lambda_2 \alpha_2$$

wherein $\lambda_1$ and $\lambda_2$ are respectively weighting coefficients of the correlation factor $\alpha_1$ and the apparent metal factor $\alpha_2$ and are set according to geological-geophysical information of the target area;

the correlation factor $\alpha_1$ associated with the observation direction is an impedance ratio $F_{EM}$ or a phase difference $P_{EM}$:

$$F_{EM} = 2\sqrt{(Z_{xy} - Z_{yx})^2 / (Z_{xy} + Z_{yx})^2}$$

wherein $Z_{xy}$ and $Z_{yx}$ respectively represent a modulus of an impedance component or an apparent resistivity in the survey line direction and the direction perpendicular to the survey line direction, or respectively represent an impedance component or an apparent resistivity of tensor impedance in a principal axis direction and a direction perpendicular to the principal axis direction after rotation to an impedance principal axis, $$P_{EM} = \sqrt{(P_{xy} - P_{yx})^2}$$

wherein $P_{xy}$ and $P_{yx}$ respectively represent a phase of an impedance component in the survey line direction and the direction perpendicular to the survey line direction, or respectively represent a phase of an impedance component of tensor impedance in the principal axis direction and the direction perpendicular to the principal axis direction after rotation to the impedance principal axis; and the apparent metal factor $\alpha_2$ associated with the frequency is determined by a ratio of a square of an impedance modulus difference at different frequencies to a square of a product of impedance modulus values of high and low frequencies:

$$\alpha_2 = \sqrt{(Z_{lf} - Z_{hf})^2 / (Z_{lf} \times Z_{hf})^2}$$

wherein $Z_{lf}$ and $Z_{hf}$ are impedance moduli or apparent resistivities of a low frequency and a high frequency respectively.

In this application example, through the calculation based on the above formula, the result of the correlation factor $\alpha_1$ associated with the observation direction is shown in FIG. 2c, and the result of the apparent metal factor $\alpha_2$ associated with the frequency is shown in FIG. 2d.

Therefore, the electromagnetic recognition factor of each survey point may be obtained according to the calculation formula. Due to a large dip angle of orebodies and strata in this application example and the development of carbonaceous slate, through comparison with known ores, it is believed that the impedance ratio $F_{EM}$ has been disturbed to a particular extent. The apparent metal factor can better reflect the distribution of favorable areas. Finally, the apparent metal factor is selected as an electromagnetic recognition factor (that is, a weight $\lambda_1$ of the correlation factor $\alpha_1$ is set to 0, and a weight $\lambda_2$ of the apparent metal factor $\alpha_2$ is set to 1).

(5) frequency to depth domain conversion: converting the tensor impedance data with the corrected static shift into a profile comprising depth-resistivity information, and performing depth restoration with the electromagnetic recognition factor.

In this application example, the conventional inversion algorithm that has been disclosed in the art is used to convert tensor impedance data with the corrected static shift and electromagnetic recognition factor data into a profile including depth-resistivity information to obtain a corresponding profile effect diagram, which has been applied to FIG. 2a to FIG. 2c. A profile effect diagram of an obtained depth-electromagnetic recognition factor has been applied to FIG. 2e.

(6) concealed orebody prediction:

For the distribution of developed orebodies in a set depth range of a target area, a favorable area is defined. The favorable area is a potential ore-bearing area, and in the invention, is an area that combines resistivity combination characteristics and high-apparent metal factors. If a work area may provide geological and prior information, which may be jointly used as a basis for recognizing the favorable area. To facilitate the description of the probability of developed orebodies in the set depth range of the target area, the favorable area may further be divided into a first-level favorable area, a second-level favorable area, a third-level favorable area, and the like. The first-level favorable area has the highest probability of concealed orebodies. The probabilities of the second-level favorable area and the third-level favorable area decrease successively.

(i) Inference based on electromagnetic recognition factor alone

In this application example, the area with an electromagnetic recognition factor greater than 0.8 is used as the first-level favorable area, the area with an electromagnetic recognition factor between 0.4 and 0.8 is used as the second-level favorable area, the area with an electromagnetic recognition factor between 0.2 and 0.4 is used as the third-level favorable area, and the like. According to the obtained electromagnetic recognition factor and a depth restoration result of the electromagnetic recognition factor, in a depth range of 1000 meters in the target area, four favorable areas may be predicted. The specific locations are shown in FIG. 2d. The electromagnetic recognition factors of areas near 1000 meters and 1750 meters in the survey line direction are greater than 1, which are both the first-level favorable areas. Although there are positions with the electromagnetic recognition factor greater than 0.8 near 1250 m, most of them are less than 0.4, so that the area is between the second-level favorable area and the third-level favorable area. The electromagnetic recognition factor of an area near 1500 meters is between 0.4 and 0.8, so the area is the second-level favorable area.

(ii) Comprehensive prediction of electromagnetic recognition factor in combination with geological-geophysical information of target area Through the existing geological-geophysical information of the target area, it is known that there are mainly igneous rock and shale here. The shale has low resistivity, and the igneous rock has high resistivity. Therefore, in this application example, a high-low resistivity transition zone is used as a parameter representing the geological-geophysical information of the target area. A concealed orebody recognition model is then constructed in combination with an electromagnetic recognition factor. The constructed concealed orebody recognition model is shown in Table 1. In this application example, the recognition model includes three geological factors and three electromagnetic factors. The geological factors include area geology, igneous rock, and structure. The upper limits of the weights are 0.05, 0.2, and 0.1, respectively. The electromagnetic factors include depth-associated resistivity characteristics, and the total weight upper limit is 0.15. The electromagnetic factor of the invention has a weight upper limit of 0.3.

In this application example, the weights of area geology factors, dike sign factors, fracture sign factors, a resistivity characteristic 1, and a resistivity characteristic 2 are used to represent their respective influence probabilities in the prediction of developed orebodies. The probability of influence of electromagnetic recognition factors in the prediction of developed orebodies is $\alpha*30\%$. When an electromagnetic recognition factor $\alpha$ is greater than or equal to 1, the electromagnetic recognition factor $\alpha$ used for calculation is 1. Next, two areas near 1000 meters and 1500 meters along the survey line of the target area are further analyzed according to a model to obtain the ore-bearing probabilities of the two areas, as shown in Table 1. It can be seen from Table 1 that because the area near 1000 meters is located near an area structure, diabase dikes and faults are developed, the electrical characteristic is a high-low resistivity transition zone, and there are large-scale low-resistivity development. The electromagnetic recognition factor is greater than 1 (the probability of influence is 30%), the probability of a developed orebody in an area near 1000 meters is about 80% in combination with the above analysis, and it indicates that the possibility of a developed orebody here is high. Because an area near 1500 meters is igneous rock, it has high resistivity, there is no high-low resistivity transition zone and low resistivity abnormal range, and there is no tensile fracture. Therefore, the probability of influence of these aspects is 0. In combination with the probabilities of influence of area geology, dike sign and electromagnetic recognition factors (the probability of influence is 18% by calculation based on 0.6), it can be obtained that the probability of a developed orebody in an area near 1500 meters is about 43%, and it indicates that the possibility of a developed orebody here is small. It is to be pointed out that the above is only an example for a specific deposit.

TABLE 1

Concealed Orebody Recognition Model

| Recognition Elements | Recognition Factor | Main Characteristics | Probability of developed orebodies near 1000 meters (%) | Probability of developed orebodies near 1500 meters (%) |
|---|---|---|---|---|
| Geological sign | Area geology | Around plate collision zones | 5 | 5 |
| | Dike sign | Development of diabase dikes | 20 | 20 |
| | Fracture sign | Presence of tensile fractures | 10 | 0 |
| Electromagnetic sign | Resistivity characteristic 1 | High-low resistivity transition zone | 10 | 0 |
| | Resistivity characteristic 2 | Large low resistivity abnormal range | 5 | 0 |
| | Electromagnetic factor sign | Electromagnetic recognition factor | Electromagnetic recognition factor (greater than 1) 30 | Electromagnetic recognition factor (0.4 to 0.8) 18 |
| Total | | | 80 | 43 |

Through the above-mentioned analysis process, an effect diagram of depth restoration prediction of a target area obtained by constructing a concealed orebody recognition model is shown in FIG. 2e. It can be seen from the figure that two favorable areas inside an igneous rock body determined according to an electromagnetic recognition factor alone are not concealed orebodies to be predicted by the invention. The concealed orebody recognition model is used to predict two favorable areas, one of which has been verified by drilling, and high-grade mining metal ores have been discovered.

What is claimed is:
1. An electromagnetic prediction method for concealed orebodies, comprising the following steps:
   (1) data acquisition: deploying a two-dimensional survey line or swath in a direction in which the surface of a target area intersects a strike of a prediction target, and observing electromagnetic fields in a survey line direction and a direction perpendicular to the survey line direction at a same survey point;
   (2) tensor impedance data acquisition: processing acquired electromagnetic field data into tensor impedance data;
   (3) static shift recognition and correction: performing a static shift analysis of the obtained tensor impedance data, recognizing a presence of a static shift, and performing static shift correction on tensor impedance data with the static shift;
   (4) electromagnetic recognition factor acquisition: respectively retrieving a correlation factor $\alpha_1$ associated with an observation direction and an apparent metal factor $\alpha_2$ associated with a frequency according to the tensor impedance data with the corrected static shift obtained in Step (3), and then calculating an electromagnetic recognition factor $\alpha$ by using the following formula:

$$\alpha = \lambda_1 \alpha_1 + \lambda_2 \alpha_2$$

wherein $\lambda_1$ and $\lambda_2$ are respectively weighting coefficients of the correlation factor $\alpha_1$ and the apparent metal factor $\alpha_2$ and are set according to geological-geophysical information of the target area;

the correlation factor $\alpha_1$ associated with the observation direction is an impedance ratio FEM or a phase difference PEM:

$$F_{EM} = 2\sqrt{(Z_{xy} - Z_{yx})^2 / (Z_{xy} + Z_{yx})^2}$$

wherein $Z_{xy}$ and $Z_{yx}$ respectively represent a modulus of an impedance component or an apparent resistivity in the survey line direction and the direction perpendicular to the survey line direction, or respectively represent an impedance component or an apparent resistivity of tensor impedance in a principal axis direction and a direction perpendicular to the principal axis direction after rotation to an impedance principal axis, $$P_{EM} = \sqrt{(P_{xy} - P_{yx})^2}$$

wherein $Z_{xy}$ and $Z_{yx}$ respectively represent a phase of an impedance component in the survey line direction and the direction perpendicular to the survey line direction, or respectively represent a phase of an impedance component of tensor impedance in the principal axis direction and the direction perpendicular to the principal axis direction after rotation to the impedance principal axis; and the apparent metal factor $\alpha_2$ associated with the frequency is determined by a ratio of a square of an impedance modulus difference at different frequencies to a square of a product of impedance modulus values of high and low frequencies:

$$\alpha_2 = \sqrt{(Z_{lf} - Z_{hf})^2 / (Z_{lf} \times Z_{hf})^2}$$

wherein $Z_{lf}$ and $Z_{hf}$ are impedance moduli or apparent resistivities of a low frequency and a high frequency respectively;

(5) frequency to depth domain conversion: converting the tensor impedance data with the corrected static shift into a profile comprising depth-resistivity information, and performing depth restoration with the electromagnetic recognition factor; and (6) concealed orebody prediction: predicting a developed orebody in a set depth range of the target area according to the electromagnetic recognition factor; or constructing a concealed orebody recognition model according to the electromagnetic recognition factor and the geological-geophysical information of the target area, and predicting a developed orebody in a set depth range of the target area according to the constructed concealed orebody recognition model.

2. The electromagnetic prediction method for concealed orebodies according to claim 1, wherein an implementation of performing a static shift analysis of the obtained tensor impedance data and recognizing the presence of a static shift in Step (3) is: setting a threshold range of static shift determination by using an average tensor impedance value of a plurality of adjacent survey points of a same frequency band, wherein when the tensor impedance data obtained in Step (2) has tensor impedance exceeding the threshold range, it indicates that a static shift is present, or otherwise, it indicates that a static shift is not present.

3. The electromagnetic prediction method for concealed orebodies according to claim 2, wherein a manner of performing static shift correction on tensor impedance data with the static shift in Step (3) is: windowing an apparent resistivity profile and a phase profile of the tensor impedance data obtained in Step (2) respectively:

(A1) constructing a filter coefficient matrix, and using the matrix as a processing window; and (A2) sliding the processing window along a survey line for filtering processing to complete static shift correction.

4. The electromagnetic prediction method for concealed orebodies according to claim 1, wherein an implementation of performing a static shift analysis of the obtained tensor impedance data and recognizing and correcting the presence of a static shift in Step (3) is:

performing a wavelet analysis on the tensor impedance data obtained in Step (2) to determine whether there is a static shift in the tensor impedance data and correct the static shift.

5. The electromagnetic prediction method for concealed orebodies according to claim 4, wherein average impedance modulus values of a plurality of frequencies of a middle frequency band in the survey line direction represent corresponding survey points, the average impedance modulus values representing the corresponding survey points are connected in the survey line direction to form a profile curve, a wavelet analysis is performed on the profile curve to obtain a time-frequency spectrum of the entire survey line, and obtained wavelet coefficients are used to determine whether there is a static shift in the tensor impedance data and correct the static shift.

6. The electromagnetic prediction method for concealed orebodies according to claim 1, wherein the tensor impedance data with the corrected static shift is converted into a profile comprising depth-resistivity information using a single-point frequency to depth domain conversion algorithm, a conversion algorithm with two-dimensional profile filtering or a two-dimensional inversion method in Step (5).

\* \* \* \* \*